United States Patent [19]
Scheer

[11] 4,441,456
[45] Apr. 10, 1984

[54] ROLL OUT NEST SYSTEM AND METHOD
[75] Inventor: Daniel J. Scheer, Goddard, Kans.
[73] Assignee: Pawnee Products, Inc., Goddard, Kans.
[21] Appl. No.: 420,094
[22] Filed: Sep. 20, 1982
[51] Int. Cl.³ .............................................. A01K 31/14
[52] U.S. Cl. .................................................. 119/45 R
[58] Field of Search ............................... 119/48, 45 R
[56] References Cited
U.S. PATENT DOCUMENTS 3,242,904 3/1966 Rannou ................................. 119/48
4,250,837 2/1981 Cocklereece .......................... 119/48
4,364,332 12/1982 Smith .................................... 119/48

Primary Examiner—Hugh R. Chamblee

[57] ABSTRACT

A roll out nest system having a support frame; and at least one integral tray supported by the frame and contoured to define individual nesting areas and egg nesting-gathering areas. An integral back plate separates each individual nesting area from each individual egg nesting-gathering area. The back plate has an egg aperture through which the eggs gravity roll from the nesting area into the egg nesting-gathering area. A method for rolling out eggs from the nest system which includes inclining backward the concaved nest area of the tray sufficiently such that when the eggs are laid in the nesting area gravity will cause the laid eggs to gently roll through the egg aperture of the back plate and into each of the respective egg nesting-gathering areas.

2 Claims, 6 Drawing Figures

ROLL OUT NEST SYSTEM AND METHOD

BACKGROUND OF THE INVENTION

1. Field of the Invention

This invention is related to a roll out nest system. More specifically, this invention provides an egg roll out nest system for hens and method for rolling out and gathering eggs from the same.

2. Description of Prior Art

U.S. Pat. No. 4,250,837 by Codslereece discloses a poultry nest formed of plastic and includes both perches and trays to receive the eggs when the same roll out of the nest. U.S. Pat. No. 3,381,664 by Barlocci teaches an animal cage formed of plastic material. U.S. Pat. No. 3,242,904 by Rannou illustrates a roll out nest construction wherein the trays are of plastic material. U.S. Pat. No. 2,676,566 by Krieger discloses a roll out nest battery. None of the foregoing prior art teaches or suggests the particular method and egg roll out nest system of this invention.

SUMMARY OF THE INVENTION

This invention accomplishes its desired objects by providing a novel arrangement of parts for assembling and deassembling a roll out nest system comprising a support frame means; and at least one integral tray means supported by the frame means and contoured to define individual egg nesting-gathering areas. At least one integral back plate means separates each individual nesting area from each individual egg nesting-gathering area. Each back plate means has a structure defining a plurality of egg apertures wherethrough the eggs gravity roll from the individual nesting area into the individual egg nesting-gathering area. The method for rolling out eggs from a nest system includes structuring the tray means into a plurality of nesting areas and egg nesting-gathering areas. The tray means is supported by a frame means. The method further includes partitioning off each individual nesting area from each egg nesting-gathering area by at least one integral partition means having a structure defining a plurality of egg apertures which allow each individual nesting area to communicate with each individual respective egg nesting-gathering area; and inclining the tray means sufficiently such that when the eggs are laid in the nesting areas gravity will cause the laid eggs to gently roll through the egg apertures of the partition means and into each of the respective egg nesting-gathering areas.

It is an object of the invention to provide a novel roll out nest system which is capable of easily being assembled.

Still further objects of the invention reside in the provision of a roll out nest system and method which can be easily transported, provides easy accessability for the hens to the nesting areas, and is relatively inexpensive to manufacture.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 1:
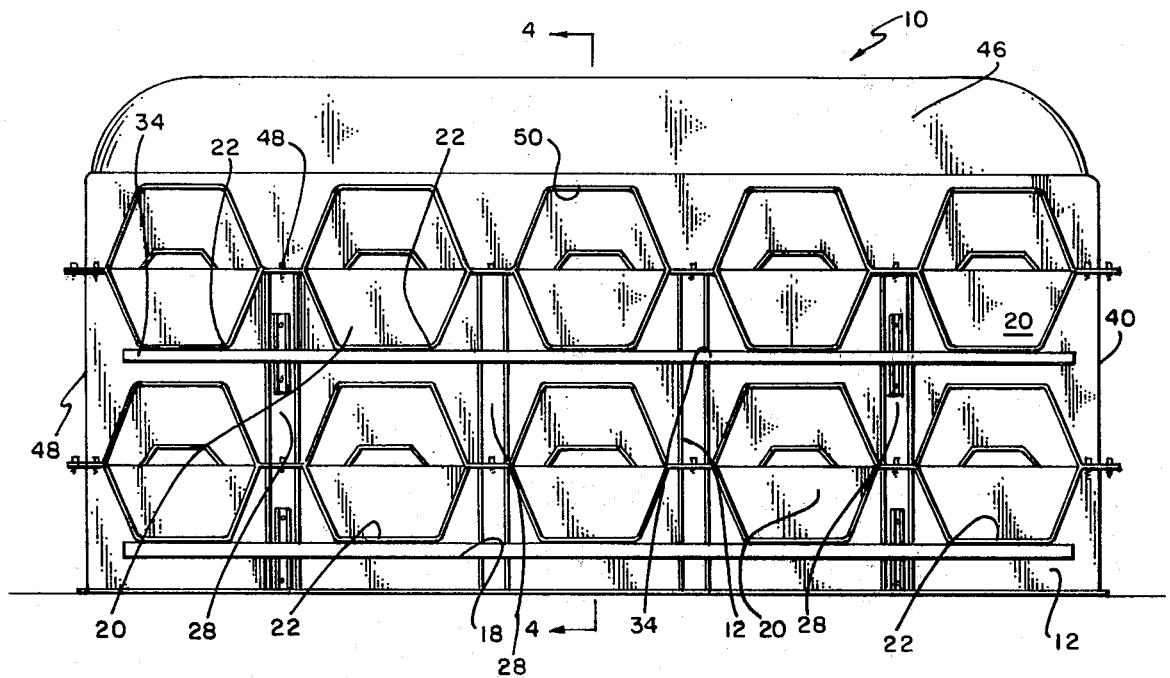
FIG. 1 is a front elevational view of the roll out nest system.
Figure 2:
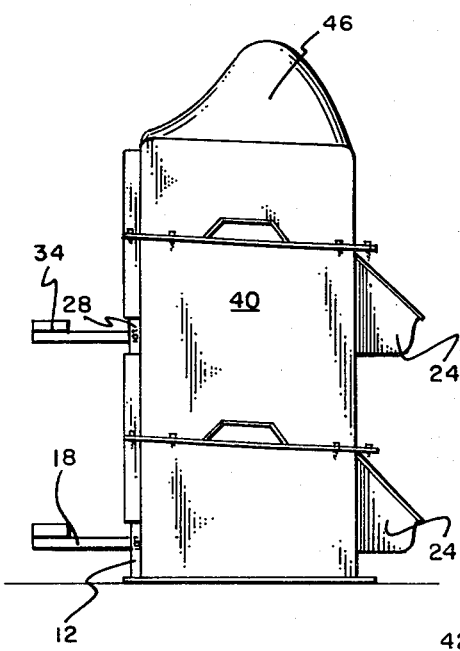
FIG. 2 is a side elevational view of the roll out nest system.
Figure 3:
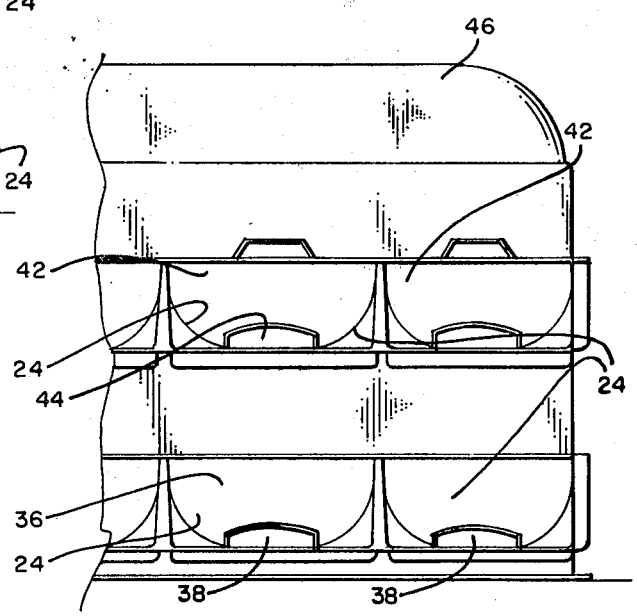
FIG. 3 is partial enlarged view disclosing the egg nesting-gathering area and the egg apertures through which the eggs roll to nest in the egg nesting-gathering area.

Referring in detail now to the drawings, wherein like reference numerals designate similar parts throughout the various views, there is seen a roll out nest system, generally illustrated as 10, having a base frame 12 including alternating base flanges 14 and base concave slots 16 alternating in sequence in order stated. Pivotally attached to base frame 12 is a base perch 18.

Figure 6:
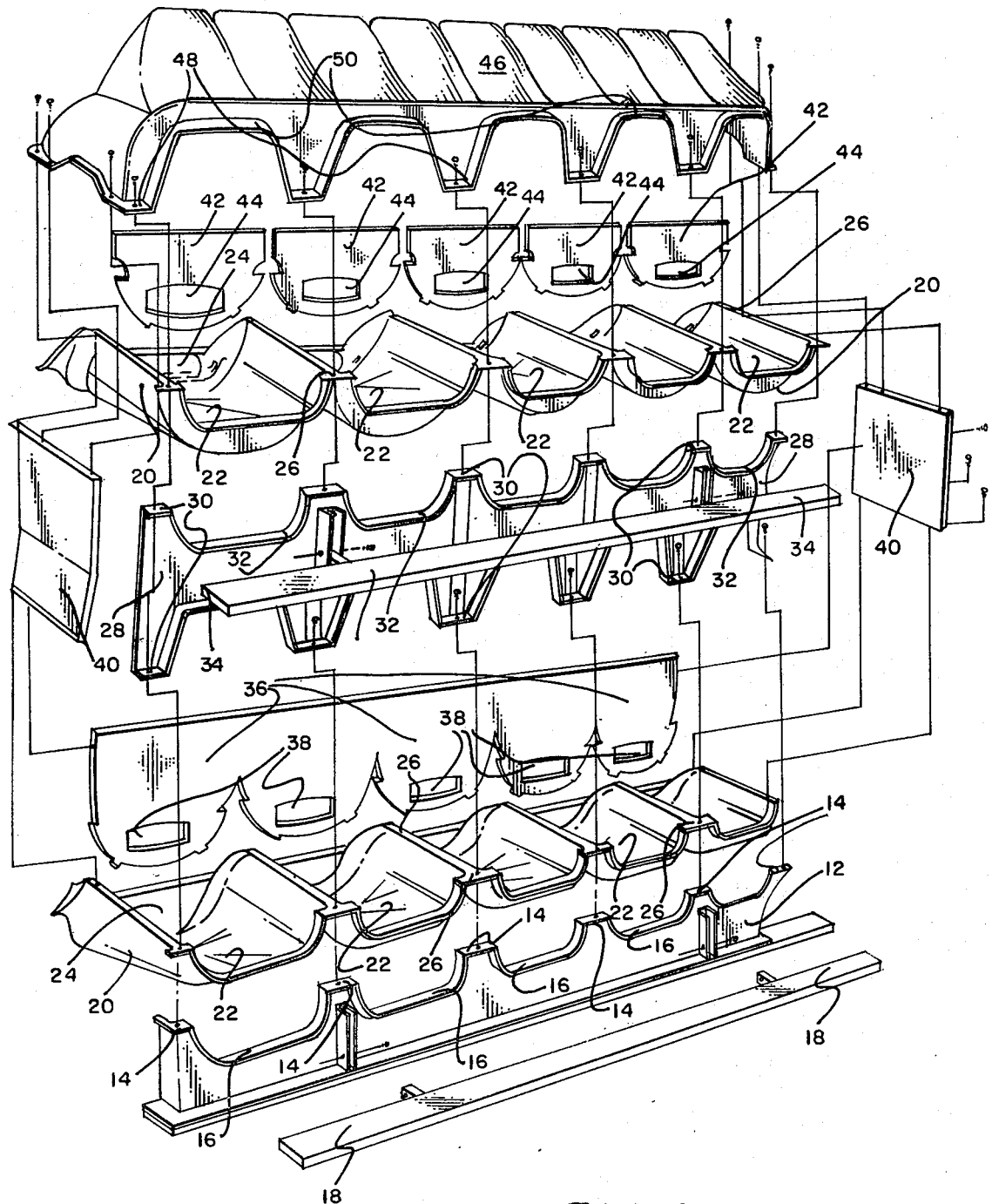
FIG. 6 is a fragmented, enlarged, perspective view of the roll out nest system.

Nest system 10 also comprises a plurality of solid integral trays 20 having individual concave nesting areas 22, egg nesting-gathering areas 24, and tray flanges 26. The tray flanges 26 and the concave nesting areas 22 are in alternating sequence as illustrated if FIG. 6.

At least one counterbrace frame 28 is provided which has opposed counterbrace flanges 30—30 and opposed concave slots 32—32 in alternating sequence in the order stated. Counterbrace perch 34 pivotally connects to each counterbrace frame 28.

The tray flanges 26 and the concave nesting areas 22 of the lower tray 20 (see FIG. 6) respectively register with the base flanges 14 and base concave slots 16 of the base frame 12 and are supported by same. Counterbrace flanges 30 on one side of the counterbrace frame 28 mate with and connect to the tray flanges 26 and the base flanges 14 of the base frame 12 in order to sandwich therebetween the tray flanges 26 to fixedly secure the lower tray 20 in place.

Figure 4:
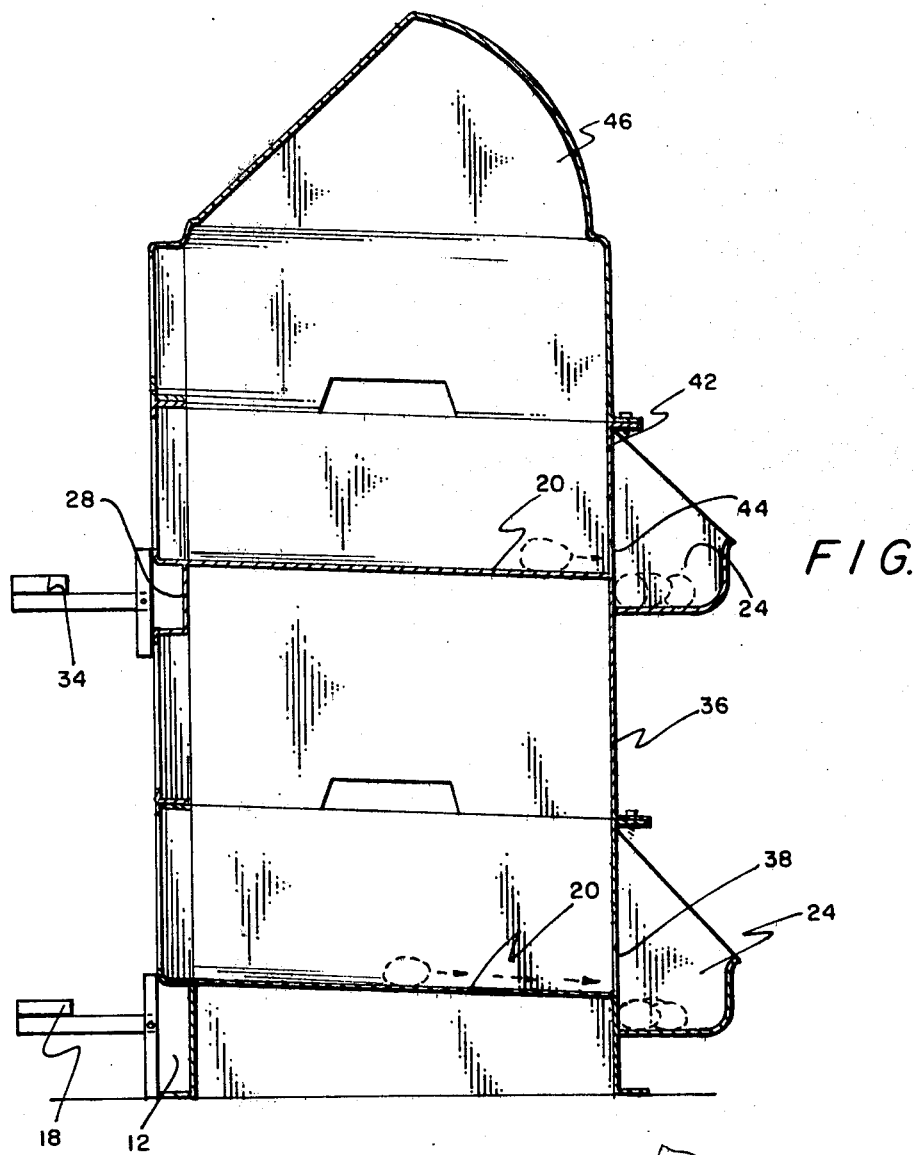
FIG. 4 is a vertical sectional view taken in direction of the arrows and along the plane of line 4—4 in FIG. 1.
Figure 5:
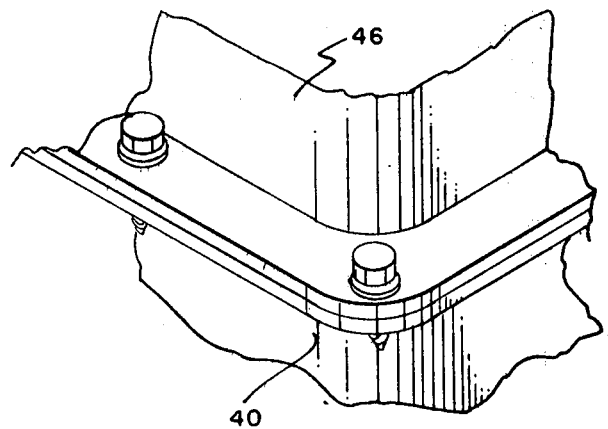
FIG. 5 is an enlarged partial view disclosing the sheet metal screws utilized in assembling the roll out nest system.

At least one integral back plate 36 lodges in the rear portion of tray 20 to separate the concave nesting area 22 from the egg nesting-gathering area 24. Back plate 36 has egg apertures 38. When tray 20 is positioned slightly on an incline, as illustrated in FIG. 4, after the eggs are laid by the hens they gravity roll from the nesting areas 22 through the egg nesting-gathering area 24 where they can be subsequently gathered.

The available centerbrace flanges 30 and centerbrace concave slots 32 opposed to the centerbrace flanges 30 and centerbrace concave slots 32 which are attached to the tray flanges 26 and to the base flanges 14 are respectively available to provide support for the tray flanges 26 and concave nesting areas 22 of another tray 20. At least one pair of end plates 40—40 interconnect the flanged sides of a lower tray 20 with the flanged sides of an upper tray 20 imposed over the lower tray 20 which enables the lower tray 20 through the use of the end plates 40—40 (and the top of back plate 36) to provide additional support for the upper trays.

It should be pointed out that my invention has been illustrated as a two (2) tier system which is preferably constructed of plastic for lightness. However, the invention is not to be limited to two (2) tiers as such, but could easily by expanded to three (3) or more tiers by simply superimposing over an existing tray 20 (supported by end plates 40—40 and counterbrace frame 28) another back plate 36, another pair of end plates 40—40 and counterbrace frame 28 in order to subsequently support still another tray 20; and the procedure may again be repeated until the desired number of tiers exist.

After the desired number of tiers is accomplished, uppermost tray 20 (see FIG. 6) has a plurality of individual egg hole plates 42 with egg hole openings 44 individually separating individual concave nesting areas 22 from the individual egg nesting-gathering areas 24 of the uppermost tray 20. The egg hole openings 44 provide the opening through which the eggs gravity roll on the uppermost tray 20 from the nesting areas 22 into the egg nesting-gathering area 24. The egg hole plates 42 are not as high as the back plate 36 and is intentionally designed as such in order for a roof 46 to be imposed thereover. Roof 46 has a structure defining a plurality of roof flanges 48 and roof concave openings 50 which are in alternating sequence in the order stated. The roof flanges 48 respectively mate with the centerbrace flanges 30 supporting the uppermost top integral tray 20 in order to sandwich therebetween the uppermost tray 20 for securing the same.

Roof concave openings 50 and centerbrace concave slots 32 provide an arc overhead entrance for the hens to facilitate entrance into the nesting areas 22. The concave nesting areas 22 are concaved sufficiently in order that the hens have sufficient privacy and aren't disturbed in their laying process by hens in a contiguous nesting area 22. The underneath side of a concave nesting area 22 of an upper tray 20 defines a roof for a concave nesting area 22 for a tray 20 immediately below.

With continuing reference to the drawings for operation of the invention, the concaved nesting areas 22 of the individual trays 20 are tilted sufficiently backward (see FIG. 4) such that when the eggs are laid by the hens in the individual concaved nesting areas 22, gravity will cause the eggs to roll towards the back of nesting areas 22, through the egg apertures 38 or through the egg hole openings 44, and into each of the respective egg nesting-gathering areas 24 communicating with the respective nesting areas 22. The eggs may subsequently be gathered for commercial utilization or private consumption.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A roll out nest system comprising a support frame means;
    at least one integral tray means supported by said frame means and contoured to define individual nesting areas for a hen and individual egg nesting-gathering areas;
    at least one integral back plate means separating each individual nesting area from each individual egg nesting-gathering area, each back plate means having a structure defining a plurality of egg apertures wherethrough the eggs gravity roll from the individual nesting area into the individual egg nesting-gathering area;
    said support frame means having a base frame including a structure on one side defining a plurality of base flanges and base concave slots, said base flanges and said base concave slots, in order stated are in alternating sequence, and said at least one integral tray means comprising a plurality of tray flanges and concave nesting areas in alternating sequence in the order stated, said tray flange and said concave nesting areas of at least one integral tray register and mate with the base flanges and base concave slots respectively of the base frame and are supported by the same, and said support frame means additionally having at least one centerbrace frame having a structure on each of the two sides defining a plurality of centerbrace flanges and centerbrace concave slots, said centerbrace flanges and said centerbrace concave slots on one side of the centerbrace frame are in direct opposed relationship with the centerbrace flanges and the centerbrace concave slots of the other side of the same and are in alternating sequence in the order stated, said centerbrace flanges on one side of the at least one centerbrace frame mate with and connect to the base flanges of the base frame and sandwiches therebetween said tray flanges to stationarily attach the at least one tray means thereto, the available centerbrace flanges and centerbrace concave slots being opposed to centerbrace flanges and centerbrace concave slots attached to the base frame respectively providing support for the tray flanges and concave nesting area of another integral tray, the top of said back plate means additionally providing support for another integral tray imposed over a lower integral tray such that the underneath side of a concave nesting area of the top integral tray defines a roof for a concave nesting area of the lower integral tray;
    at least one pair of end plates interconnecting the flanged sides of at least one integral tray means with the flanged sides of at least one other integral tray imposed over the lower integral tray to also provide support for the upper integral tray by the lower integral tray, the top integral tray imposed over at least one lower integral tray and over at least one centerbrace frame and over at least one pair of end plates comprises a plurality of egg hole plates having an egg hole opening, said egg hole plates individually separating individual concave nesting areas from the individual egg nesting-gathering areas while providing the egg hole opening through which the eggs gravity roll from the nesting area into the egg nesting-gathering area;
    and a roof member having a structure defining a plurality of roof flanges and roof concave openings, said roof flanges and said roof concave openings, in order stated, are in alternating sequence, said roof flanges respectively mating with the centerbrace flange of the centerbrace frame supporting the top integral tray in order to sandwich therebetween said top integral tray and to secure same, and said roof concave openings and said centerbrace concave slots define and provide an arc overhead entrance for the hens to facilitate entrance into the nesting areas.

2. The nest system of claim 1 additionally comprising a base perch means pivotally attached to said base frame; and at least one counterbrace perch means pivotally attached to said at least one counterbrace frame.

* * * * *